No. 721,844. PATENTED MAR. 3, 1903.
T. B. STEVENSON.
NUT LOCK.
APPLICATION FILED JUNE 6, 1902.
NO MODEL.
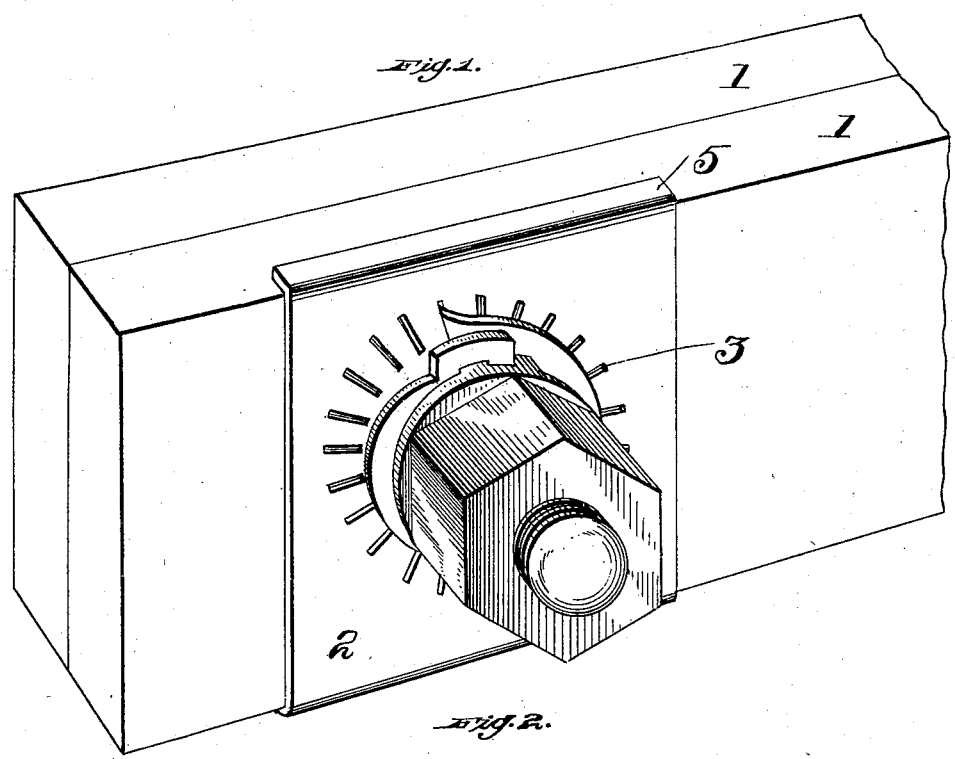
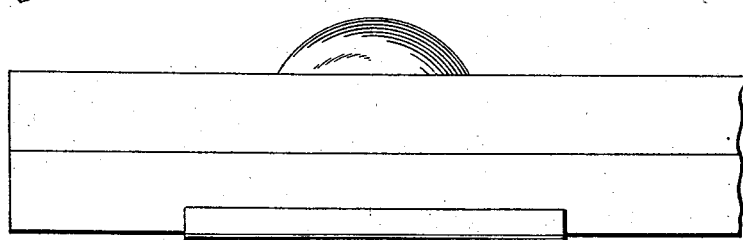
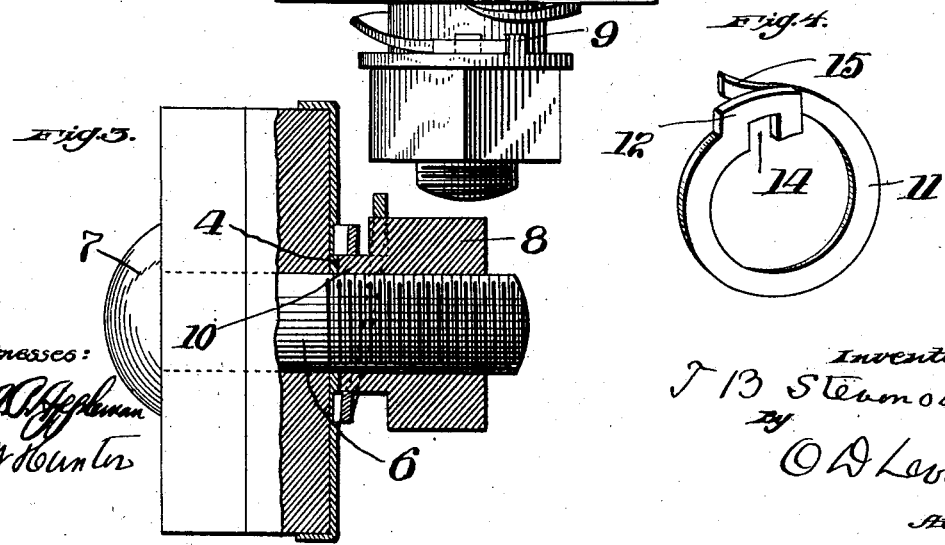
Inventor
T B Stevenson
By
O D Levis
Atty.

UNITED STATES PATENT OFFICE.

THOMAS B. STEVENSON, OF MADISON TOWNSHIP, COLUMBIANA COUNTY, OHIO.

NUT-LOCK.

SPECIFICATION forming part of Letters Patent No. 721,844, dated March 3, 1903.

Application filed June 6, 1902. Serial No. 110,537. (No model.)

*To all whom it may concern:*

Be it known that I, THOMAS B. STEVENSON, a citizen of the United States, residing in Madison township, in the county of Columbiana and State of Ohio, have invented a new and useful Improvement in Nut-Locks, of which improvement the following is a specification.

This invention relates to certain new and useful improvements in nut-locks, and has for its object the provision of novel means whereby a nut is securely locked to a bolt and prevented from turning in the reverse direction.

The present invention contemplates to provide a nut-lock that may be easily attached and detached when desired; furthermore, one that may be used a number of times.

A still further object of my invention is to provide a nut-lock that will be extremely simple in construction, strong, durable, comparatively inexpensive to manufacture, and highly efficient in its use.

With the above and other objects in view the invention consists in the novel construction, combination, and arrangement of parts, to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a perspective view of my improved nut-lock, showing the same applied in position. Fig. 2 is a top plan view thereof. Fig. 3 is a vertical sectional view, partly broken away. Fig. 4 is a perspective view of the spring-washer.

In the drawings the reference-numerals 1 1 represent pieces of material which are to be locked together, and 2 represents the locking-plate. In this locking-plate there are formed a series of slits or openings 3, which extend radially from the center, and a central opening 4 is formed in this locking-plate. Inwardly-extending flanges 5 are formed on the upper and lower sides of the locking-plate 2. These flanges may be formed before or after the locking-plate is applied, and in some constructions these flanges may be applied to the sides of the plate instead of the upper and lower edges thereof. A screw-threaded bolt 6, carrying a head 7, said bolt being of ordinary construction, passes through the parts that are to be locked, and a nut 8, carrying projections 9 on its inner face, is applied upon the screw-threaded bolt. The said nut has formed integral therewith a collar 10, which is surrounded by a spring-washer 11, the one end of said washer carrying a head 12, in which is formed a notch 14, engaging one of the projections 9 of the nut, and the other end 15 of the spring-washer 11 is slightly curved inwardly and is adapted to engage one of the recesses 3 of the locking-plate.

The operation of my improved nut-lock, as well as the many advantages obtained by the use of the same, will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a nut-lock, the combination of a screw-threaded bolt, a nut carrying projections and an integral collar, a spring-washer having a head and notches formed therein to engage one of said projections, a locking-plate having a series of notches extending radially formed therein, the other end of said spring-washer forming a locking engagement with one of said notches, and means whereby the locking-plate is securely retained in position, all parts being arranged and operating substantially as described.

In testimony whereof I have hereunto signed my name in the presence of two subscribing witnesses.

THOMAS B. STEVENSON.

In presence of—
F. O. HENZI,
M. HUNTER.